R. B. ROBINSON.
TRANSPOSING MUSICAL CHART.
APPLICATION FILED JUNE 22, 1918.

1,354,214.

Patented Sept. 28, 1920.
2 SHEETS—SHEET 1.

Inventor
Robert B. Robinson

By W. F. Davis & Son
Attorney

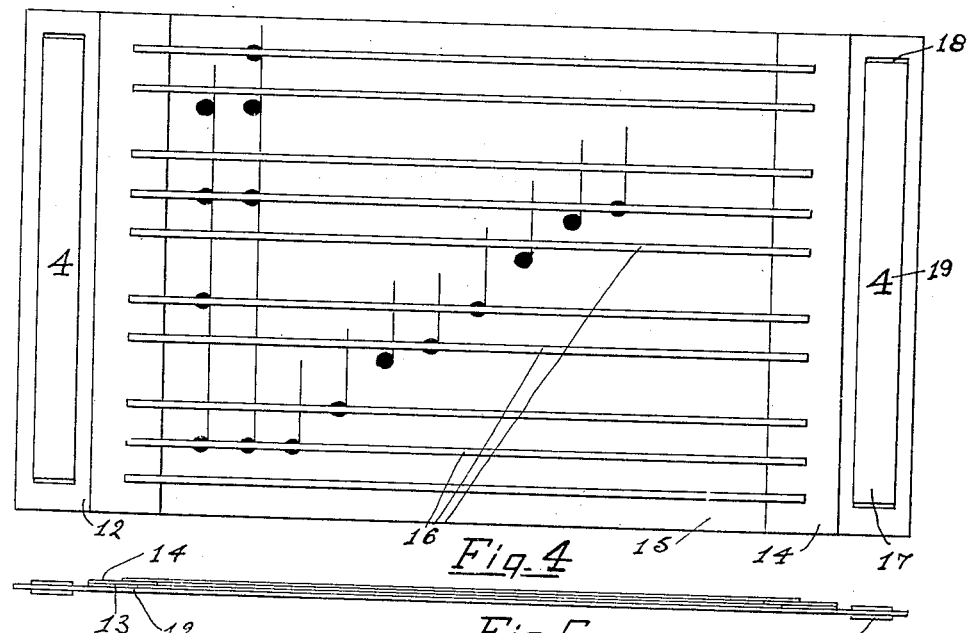
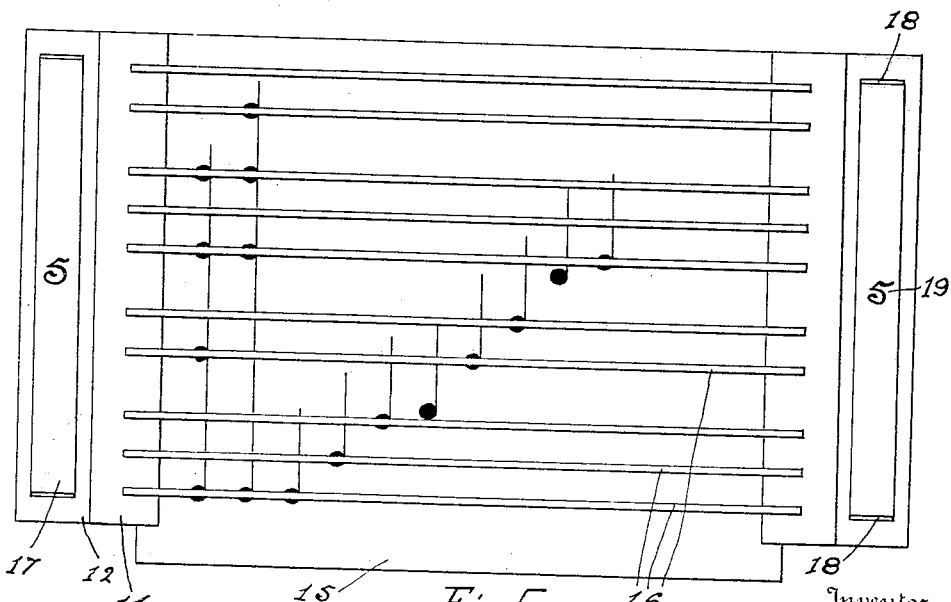

UNITED STATES PATENT OFFICE.

ROBERT B. ROBINSON, OF KANSAS CITY, MISSOURI.

TRANSPOSING MUSICAL CHART.

1,354,214. Specification of Letters Patent. Patented Sept. 28, 1920.

Application filed June 22, 1918. Serial No. 241,424.

*To all whom it may concern:*

Be it known that I, ROBERT B. ROBINSON, a citizen of the United States, residing at Kansas City, in the county of Jackson and State of Missouri, have invented certain new and useful Improvements in Transposing Musical Charts, of which the following is a full, clear, and exact description, such as will enable others skilled in the art to which it appertains to make and use the same.

The invention relates to adjustable music notation and more particularly to the shifting of staffs and notes one in relation to the other, and has provided a simple and efficient means of shifting notes and staffs with relation to each other.

An object of the present invention is to provide an arrangement of music staff and notes so constructed that the notes can be shifted in various positions upon the staff, this being extremely valuable in orchestras, in singing, and to composers of music.

A further object of the present invention is to provide adjustable numbers to indicate the various staffs in relation to the various octaves and arrange the numbers so that they may be shifted on the staffs to change their relative positions with the octaves upon the piano.

A further object of the present invention is to provide a transparent sheet upon which music staffs are printed, transparent sheets upon which notes are printed being arranged behind said transparent staff sheet and a non-transparent sheet behind all the transparent sheets so that the notes will appear as though they were on the staff, and the transparent sheets are movable upon the latter sheet to arrange the notes in different keys and different relations to each other.

A still further object of the present invention is to provide numbers upon the staffs in place of the common and well known mark 8va. The numbers being easier to read, showing the corresponding octave and having a wider field for the reason that it can be applied to two or more octaves as well as one.

With these and other objects in view the invention consists in the position, adjustable features, combinations and arrangements of parts hereinafter set forth, illustrated in the drawings and more particularly pointed out in the appended claims, the accompanying drawings illustrating a form of the invention.

Fig. 4, is an enlarged face view of a modified form of the structure.

Fig. 5, is an enlarged face view of the modified form with the music sheet in a different adjusted position.

Fig. 6, is an enlarged edge view of the modified structure.

Figure 1:
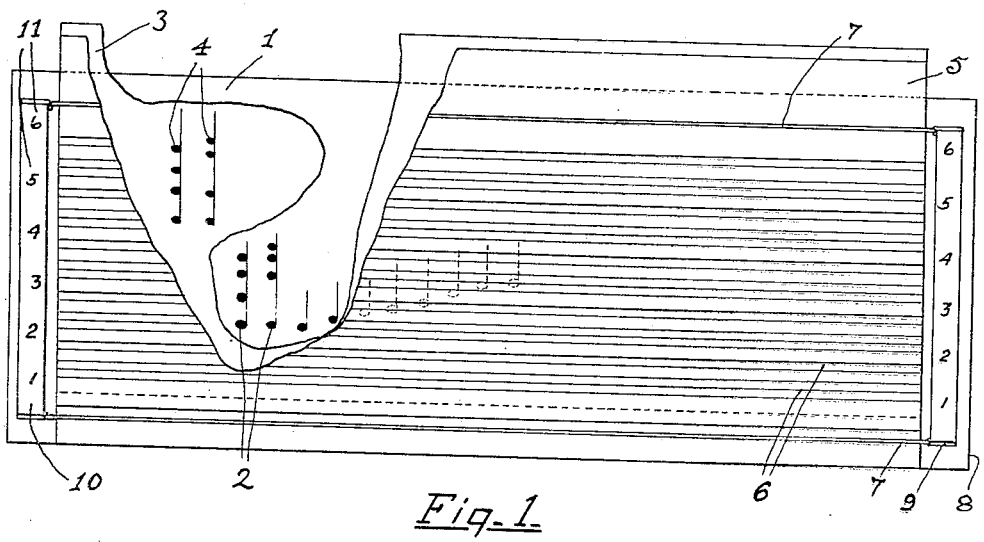
Figure 1, is a face view of a structure illustrating the improved changeable music notation with certain parts broken away to more clearly illustrate the construction and adjustment.
Figure 2:
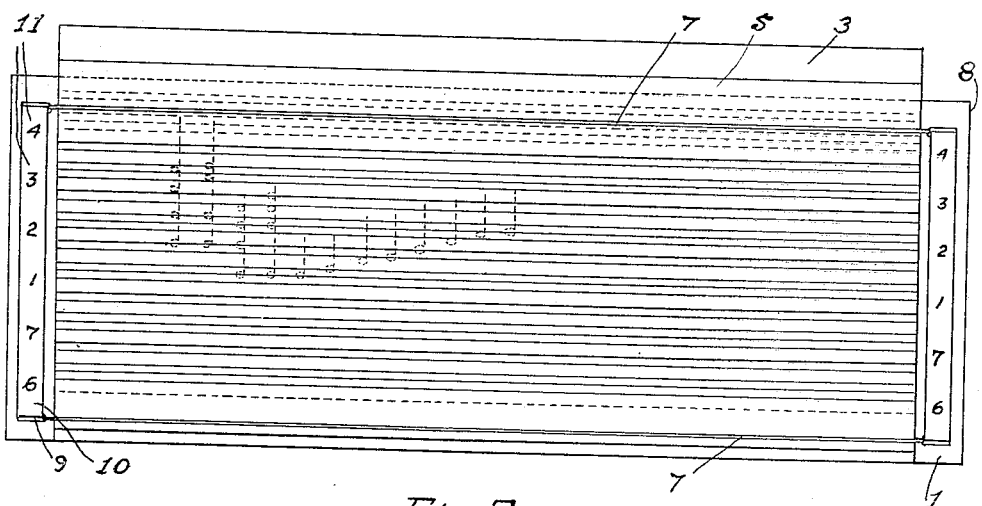
Fig. 2, is a face view of the structure with one of the transparent sheets in a different adjusted position from that shown in Fig. 1.
Figure 3:
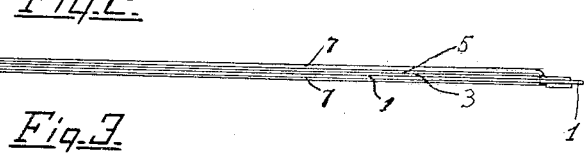
Fig. 3, is an edge view of the structure.

The sheet 1 is preferably of stiff material as thin card board, with the notes 2 appearing thereon, it being understood that the notes shown are merely an example and that the notes of any music may be made to appear upon the sheet.

Spread upon the sheet 1 is the transparent sheet 3 with the notes 4 appearing thereon, these notes being merely to illustrate that any desired notes may be printed or otherwise placed upon the sheet.

Over the sheet 3 is spread the transparent staff sheet 5 with the staff lines 6 thereon, it being understood that all the sheets may be of any width and length to correspond to the notation that may be desired or required.

The sheets 3 and 5 are held in position by the retainers 7 which may be cords or bands but preferably of elastic material and glued or otherwise secured to the sheet 1, the sheets being easily slipped beneath the retainers and adjusted to the desired position. The retainers 7 being resilient it is obvious that any number of the sheets 3 with the notes 4 thereon may be retained by the retainers.

The ends 8 of the sheets 1 extend laterally as shown beyond the sheets 3 and 5 and are provided with the slits or slots 9 in which are mounted the endless staff bands 10 upon which appear the numerals 11 to indicate the number of the staff it is desired to render music from.

In transposing music, the bands 10 may be so adjusted as to place the notes 2 and 4 collectively or separately in any one of the several staffs, and the notes 2 and 4 may be played in the same staff and also in separate staffs. Certain notes may be written on the sheet 1 and several of the sheets 3 with differing notes 4 tried out one at a time, providing a means of various trials without rewriting any of the notes.

The adjustment of the notes and staffs are particularly adaptable to the five line staff shown, but no claim is made herein for the five line staff and it is desired to apply the features claimed to any adaptable staff.

In the modified views 4, 5 and 6 the sheet 12 has mounted thereon the spacing strips 13, and on the latter are mounted the retaining strips 14, the sheet and the spacing strips and the retaining strips being secured together by gluing or otherwise and forming guides to receive the music sheet 15, the notes appearing on the music sheet.

In this structure the sheet 15 may be slipped to and fro upon the sheet 12 within the guides formed by the sheet, the spacing strips and the retaining strips. It is obvious that any number of the sheets 15 may be employed successively or simultaneously.

The spacing strips project as shown and are provided with the slits or slots 18 in which the endless bands 17 are mounted and upon which the staff numerals 18 appear.

From the foregoing it will be understood that the music may be shifted to any desired key by shifting the sheets and the bands containing the numerals representing the number of the staff.

The improved adjustable music notation is of chief importance for shifting the key of music to correspond to the range of the voice, for orchestras, and may be advantageously employed by composers of music.

It is obvious that changes may be made in the construction as set forth without departure from the essentials of the invention.

What I claim as new, and desire to secure by Letters Patent, is:—

1. In a transposing musical chart, a music sheet, notes on said sheet, retainers on said sheet, a transparent sheet with staff lines thereon, circuitously movable bands in the margin of said music sheet, numerals on said bands to indicate the pitch of the octave, said transparent sheet adjustably secured to said music sheet by said retainers.

2. In a transposing musical chart, a non-transparent music sheet, notes on said sheet, a transparent music sheet, notes on said transparent music sheet, a transparent staff sheet, staff lines on said transparent staff sheet, means to retain said sheets together, said means allowing the adjustment of said sheets to change the position of said notes with relation to said staffs.

3. In a transposing musical chart, a non-transparent music sheet with notes thereon, a plurality of transparent music sheets with notes thereon, a staff sheet with staffs thereon, and means to retain said sheets one against the other, said means allowing the adjustment of said sheets to change the notes with relation to the staff.

In testimony whereof I affix my signature in the presence of one witness.

ROBERT B. ROBINSON.

Witness:

RUTH RIDGELL.